US006757816B1

(12) United States Patent
Yoaz et al.

(10) Patent No.: US 6,757,816 B1
(45) Date of Patent: Jun. 29, 2004

(54) FAST BRANCH MISPREDICTION RECOVERY METHOD AND SYSTEM

(75) Inventors: Adi Yoaz, Talmy-Menache (IL); Gregory Pribush, Beer Sheva (IL); Freddy Gabby, Tel-Aviv (IL); Mattan Erez, Haifa (IL); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/476,227

(22) Filed: Dec. 30, 1999

(51) Int. Cl.[7] .................................................. G06F 9/00

(52) U.S. Cl. ...................................... 712/239; 712/207

(58) Field of Search ................................ 712/233, 234, 712/235, 207, 239, 240

(56) References Cited

U.S. PATENT DOCUMENTS

| 5,434,985 A | * | 7/1995 | Emma et al. ................ 712/215 |
| 5,644,779 A | * | 7/1997 | Song ............................ 712/200 |
| 5,682,493 A | * | 10/1997 | Yung et al. .................. 712/217 |
| 5,802,338 A | * | 9/1998 | Rechtschaffen et al. .... 712/216 |
| 5,805,876 A | * | 9/1998 | Bose et al. .................. 712/216 |
| 5,857,089 A | * | 1/1999 | Goddard et al. ............ 712/222 |
| 5,964,869 A | * | 10/1999 | Talcott et al. ............... 712/236 |
| 6,219,784 B1 | * | 4/2001 | Witt ............................ 712/235 |
| 6,289,442 B1 | * | 9/2001 | Asato .......................... 712/206 |

* cited by examiner

*Primary Examiner*—Eddie Chan
*Assistant Examiner*—Charles Harkness
(74) *Attorney, Agent, or Firm*—Pillsbury Winthrop LLP

(57) ABSTRACT

A system and method for recovering from mispredicted paths in pipelined computer architectures. Targets within an instruction window exhibit spatial locality. To exploit this property, a mechanism detects the branch target within the instruction window. A second process eliminates the need for full renaming and re-execution of mispredicted paths by handling a dependency chain of instructions.

28 Claims, 7 Drawing Sheets

```
a:    instruction 1
      instruction 2
      branch a
b:    instruction 3
      instruction 4
```

FAST BRANCH MISPREDICTION RECOVERY METHOD AND SYSTEM

BACKGROUND OF THE INVENTION

1. Field of the Invention

The present invention relates in general to computer architecture, and in particular to a method and system to reduce the branch misprediction penalty, a problem in pipelined computer architectures.

2. Description of the Related Art

As microprocessor throughput rate is the overriding factor dictating overall system performance, designers use numerous techniques to increase microprocessor throughput. Microprocessor performance can be described as the number of computations per second or instructions executed per microprocessor clock cycle. To improve the instructions per clock (IPC), as well as increasing the clock speed, a common approach is to utilize microprocessor pipelining. Pipelining breaks execution of an instruction into several stages, all of which can be run in parallel. Simply put, pipelining is a technique whereby the next cycle function execution is started before the current cycle function execution is completed.

Using pipelined processing, instruction processing is broken up into several stages, sometimes called "pipestages." A processor can start the execution of parts of a complex instruction in an early pipeline stage before the preceding instruction has been completed in the last pipeline stage. To facilitate calculations in parallel, pipelined processors execute instructions along predicted paths, and then validate the data resulting from a predicted path.

An out-of-order pipelined processor may perform several relevant pipestages out of order. Examples of such pipestages include: fetching of the instruction from the memory hierarchy to the processor; decoding opcodes, architectural sources and destinations; allocating physical destination registers; identifying physical sources; determining which instruction are to be executed within the next instruction cycle; executing instructions; and retiring registers and memory values.

Instructions are executed out-of-order and their results are temporarily stored. Instructions are retired when all previous instructions have retired and the instruction itself is executed and, if needed, verified. An instruction may be executed, but not retired if, for example, it found to be in wrong path and has to be discarded.

Instructions are executed along a speculated path based on branch prediction. This prediction is checked when the branch direction is verified. In case of misprediction, the wrong path should be discarded and instruction should be executed from the correct path.

In pipelined processors, data can be loaded into the register file when the execution stages have successfully completed the execution stage generating the data. This pipestage, where the branch outcome is resolved, is called the branch resolution stage. Data is typically retired when it has undergone "de-speculation" where the data is validated as accurate by the pipeline control logic. In a pipelined processor, each execution pipestage is implemented in an execution unit, with the first of such execution units receiving instructions and data from the register file. To return data results after execution in a traditional pipelined processor, each execution unit has a separate return bus coupled to the register file or some cases execution units can share an arbitrated return bus. In the traditional pipelined processor, each execution unit accomplishes de-speculation so that data can be directly retired to the register file.

Conditional branches present problems for pipelined processors. Since the conditional branch status is computed at the execute pipestage, there would be a bubble in the pipelined processor if the conditional branch is stalled until it is resolved. To reduce this penalty, speculative processors attempt to predict the direction of the conditional branch, and fetch the subsequent instructions according to the prediction. In case of a processor misprediction, all the "bogus" instructions are flushed. When a microprocessor speculatively executes instruction along a mispredicted path, the processor must 1) recover from the mispredicted path; and, 2) restart by executing the instructions from the correct branch target. The time lost, calculated by the number of cycles, is called the "misdirection penalty." Two major factors increase the misdirection penalty. First, superpipelining techniques increase the distance (in terms of pipestages and cycles) of the branch resolution stage. When the distance between branch resolution stages is increased, more instructions are incorrectly fetched before the misprediction is detected. These mispredicted instructions are flushed and new instructions are fetched, increasing the misprediction penalty. Secondly, increasing the speculation degree, accomplished by expanding the instruction window fetched by the processor, results in a higher misdirection penalty, since less valid instructions are available as candidates for execution. These mispredicted instructions are also flushed, increasing the misprediction penalty.

Thus, what is needed is a fast method and system to recover from branch misdirection that can be used in microprocessors utilizing super-pipelining and increased speculation degree techniques.

SUMMARY

The fast branch misprediction recovery process and system detects a branch target within an instruction window. Once the branch target is detected, an instruction dependency chain of the branch target can be recovered within the instruction window. Bogus instructions are flushed from the instruction window. The remaining instructions in the instruction window are executed.

BRIEF DESCRIPTION OF THE DRAWINGS

The inventions claimed herein will be described in detail with reference to the drawings in which reference characters identify correspondingly throughout and wherein:

DETAILED DESCRIPTION

Figure 1:
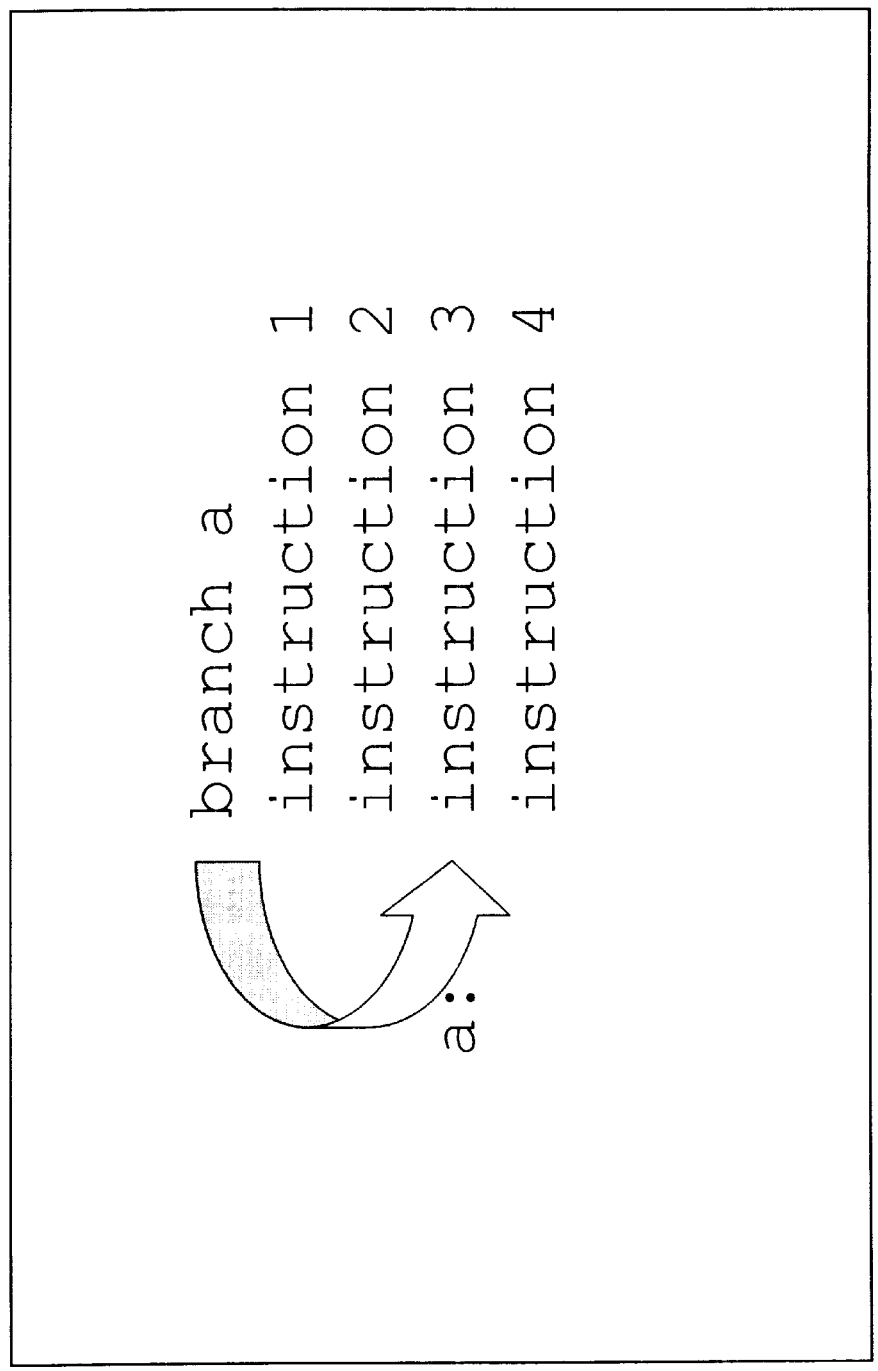
FIG. 1 is an illustration of a forward branch.

The basic principle of fast branch misprediction recovery is based on the property that the actual targets of mispredicted branches exhibit spatial locality. Simply put, several instructions from the correct path are likely to be in the instruction window, despite the branch being misdirected. Therefore, instead of flushing all the instructions that follow a mispredicted branch, a processor can attempt to detect the correct branch target within the instruction window, eliminating its fetch. This reduces the misdirection penalty. This method is especially advantageous for forward branches that are predicted as not taken. However, the method can also be useful in certain cases of backward branches that are predicted and located inside a loop body. FIG. 1 illustrates a common situation. For example, assume that the forward branch is actually taken, but the branch predictor incorrectly predicts that it is not taken. The consequence from this is that all the instructions that follow this branch are fetched. In this example, these are instructions 1, 2, 3, and 4. Once the branch is resolved, instructions 3 and 4, from the correct branch target, do not have to be fetched, since the instructions already reside within the microprocessor. Thus, only instructions 1 and 2 should be flushed.

Figure 2:
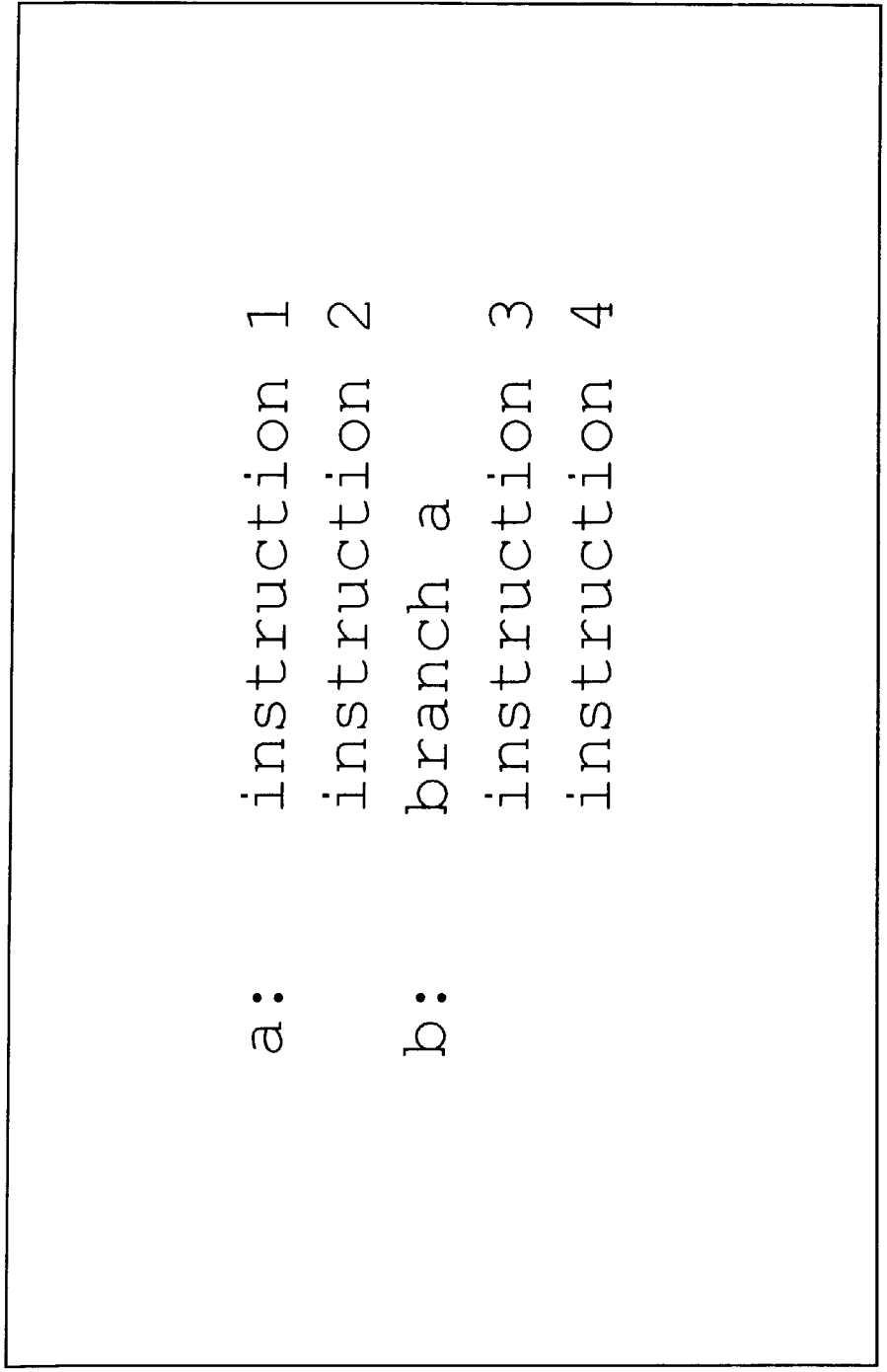
FIG. 2 is an illustration of a backward branch.

FIG. 2 depicts the case of a backward branch, another situation that is remedied by the method. For illustrative purposes, assume that the branch is actually not taken, but the branch predictor predicts that it is taken. As a result of the misprediction, both the taken branch, represented by instructions 3 and 4, and the untaken branch, represented by instructions 1 and 2, are fetched. Moreover, assume that when the branch is fetched at the second time, the first branch has not been resolved yet, and that the branch is predicted as not taken, and therefore instructions 3 and 4 are fetched. Once the first branch is resolved, instructions 3 and 4 from the correct branch target do not have to be fetched, and only instructions 1, 2, and the branch (fetched at the second time), should be flushed.

To exploit the spatial locality property of the actual targets, two basic mechanisms are used. First, a mechanism detects the branch target is already within the instruction window. Second, the dependency chain of instructions, following the mispredicted path, is handled. This second process eliminates the need for full renaming and re-execution of mispredicted paths. The first mechanism is called the Branch Alternative Target Detector (BATD), and the second is termed the Dependency Chain Recovery Mechanism (DCRM).

It is well understood in the art, that the following embodiments may be implemented in hardware, firmware, or software residing on storage media, using a general purpose computer as is known in the art.

Figure 3:
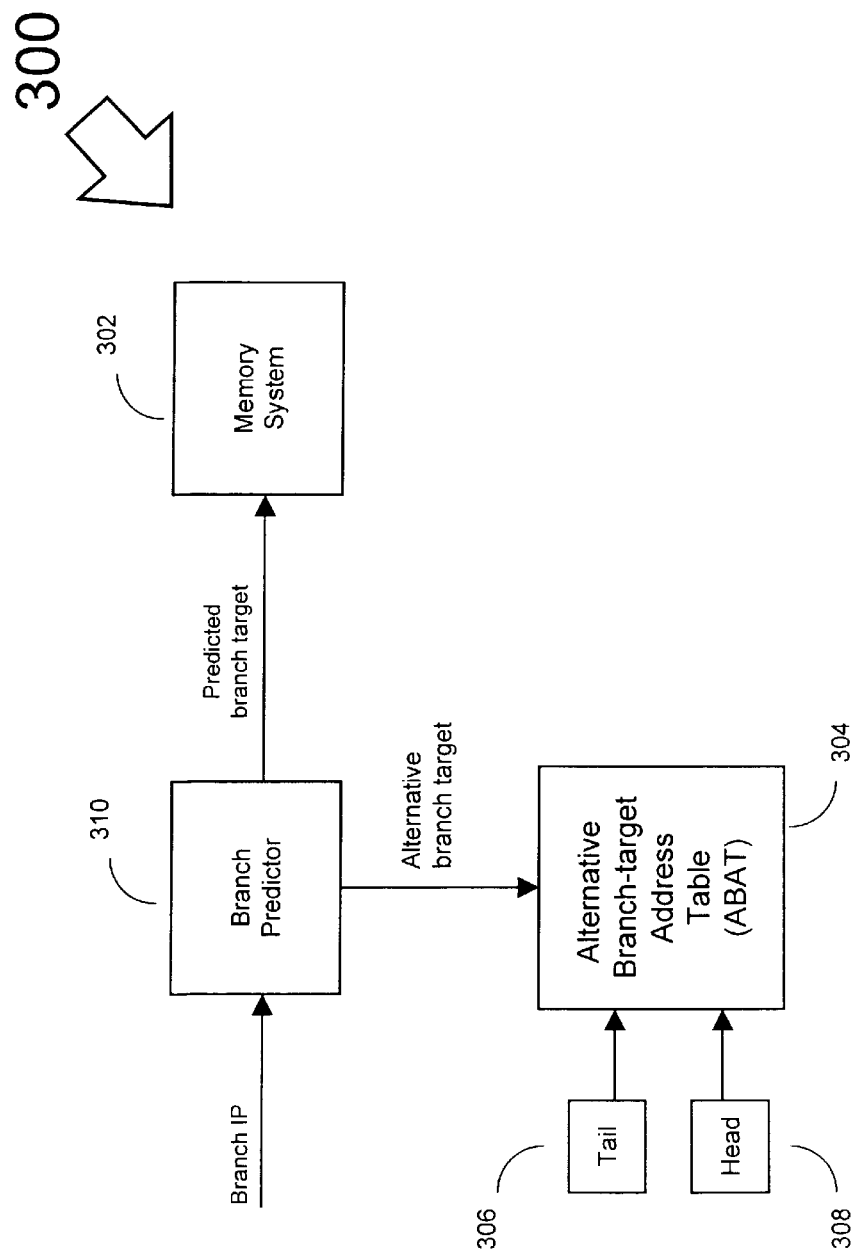
FIG. 3 is a functional block diagram of the Branch Alternative Target Detector (BATD)

An embodiment of the branch alternative target detector is shown in FIG. 3. The branch alternative target detector 300 is comprised of a branch predictor 310 coupled to a memory system 302 and an alternative branch-target address table (ABAT) 304. Head 308 and tail 306 pointers define the boundaries of valid entries in the alternative branch-target address table 304.

Figure 4:
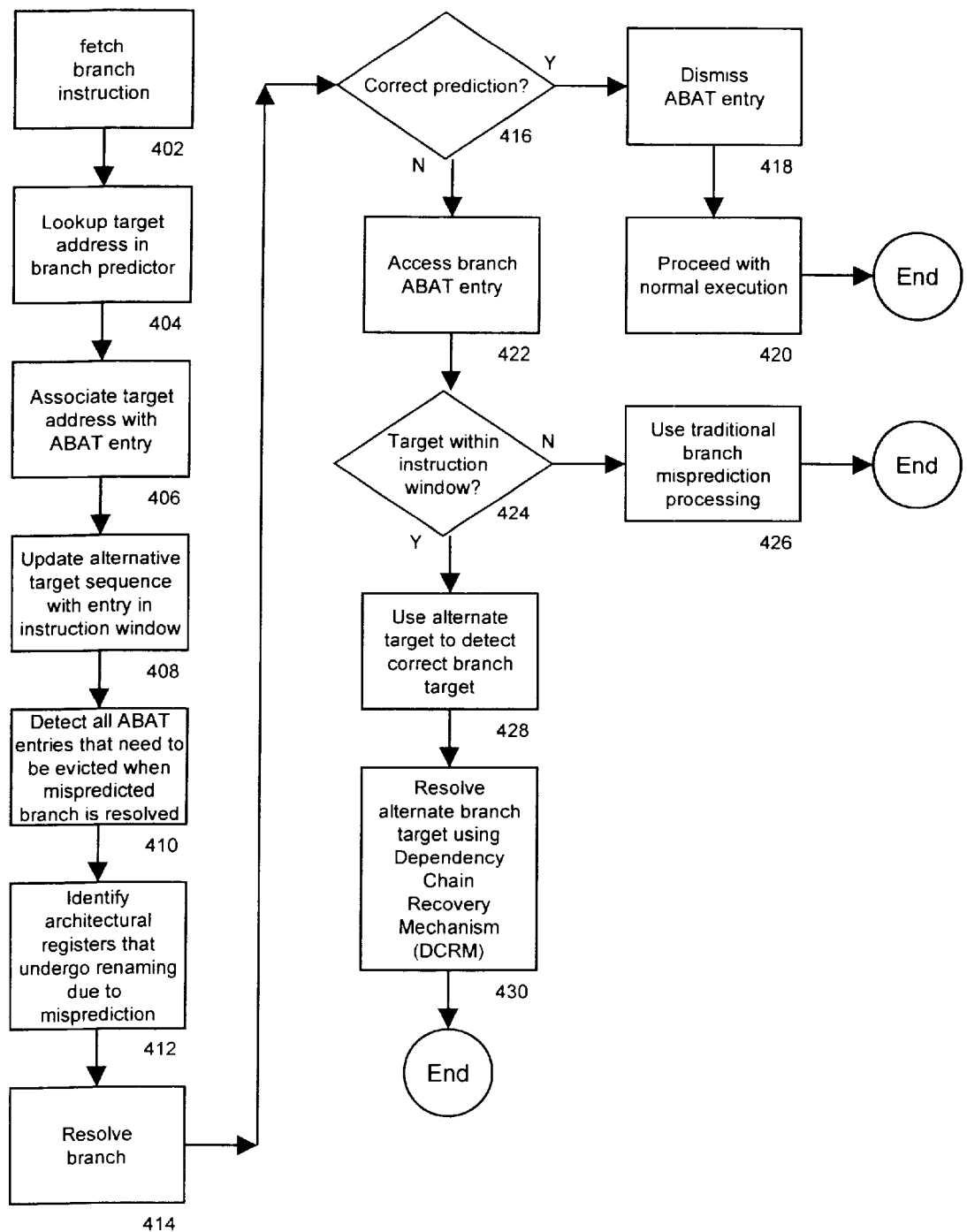
FIG. 4 is a flowchart of an embodiment of a Branch Alternative Target Detector of FIG. 3.

The operation of the alternative branch-target address table 304 is better understood by example as seen in FIG. 4. When a branch instruction is fetched, block 402, a look up is performed in the branch predictor 310 in order to obtain its target address, block 404. The target address is then forwarded to the microprocessor memory system 302. In block 406, a unique entry, which is associated with the specific branch, is allocated in the Alternative Branch-target Address Table (ABAT) 304. Note that the alternative branch-target address table 304 can be a special cyclic buffer of any kind known in the art. ABAT entries are sequentially allocated in the table by using head 308 and tail 306 pointers that define the boundaries of valid entries. Because the ABAT head 308 and tail 306 pointers define the region of valid entries, this also eliminates the need for a "valid bit" for the alternative branch-target address table 304. Optionally in some embodiments, entries can be allocated only for forward branches that are predicted as not taken, as this is a common case where the method is useful.

Figure 5:
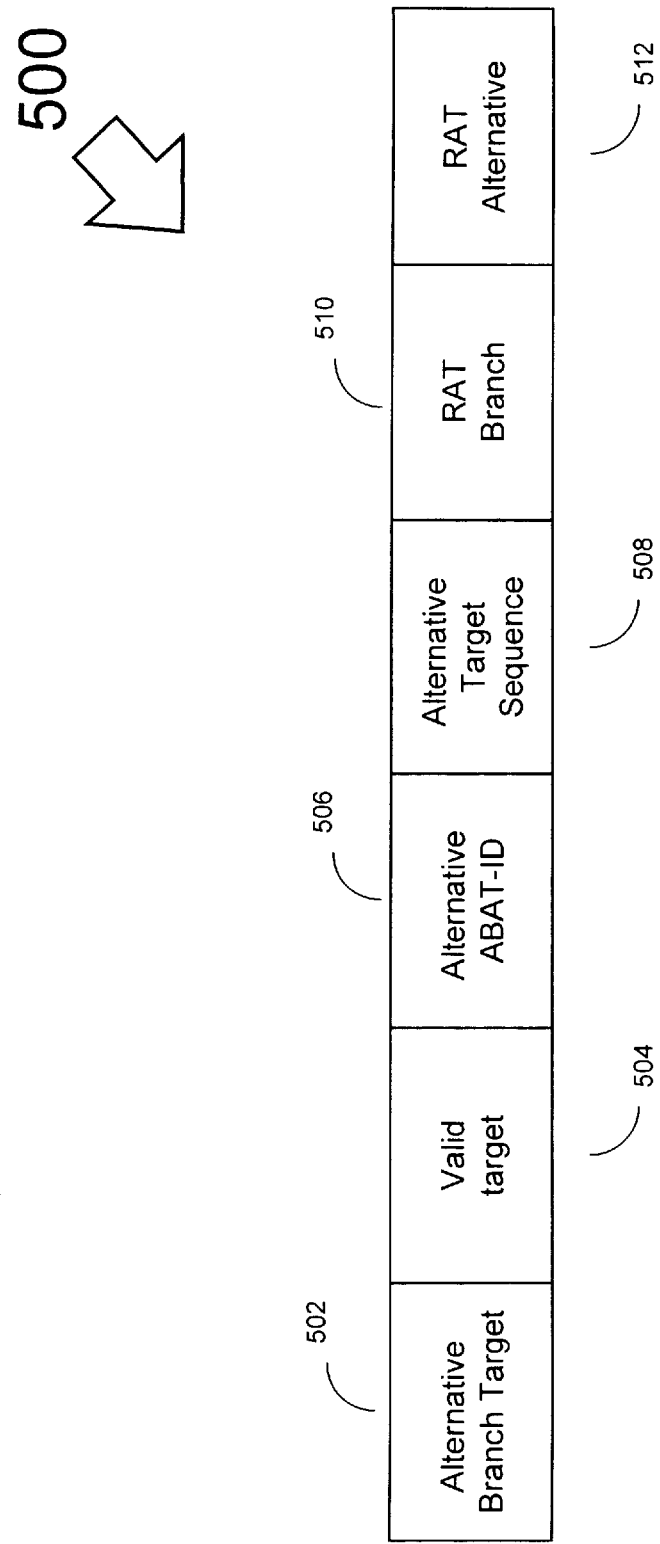
FIG. 5 represents the format of an entry in the Alternative Branch-target Address Table (ABAT)

Each entry in the ABAT has several fields as illustrated in FIG. 5. ABAT entries 500 are comprised of the following fields: an alternative branch target 502, a valid target 504, an alternative ABAT-Identifier 506, an alternative target sequence 508, a Register Alias Table (RAT) branch 510, and a RAT alternative field 512. These fields are best explained through their use in FIG. 4.

Returning to FIG. 4, the alternative branch target field 502 is used in order to check whether the alternative branch target has entered the microprocessor. In block 408, the alternative branch target field 502 is updated with the alternate target determined by the branch predictor 310. If the branch was predicted "not taken," then the field 502 is initialized with the taken-branch target, as determined by the branch predictor 310. Otherwise, it is initialized with the fall-through target that is given by the branch instruction pointer (IP) and the branch instruction's length.

The valid target field 504 indicates whether there is an instruction in the stream that follows the branch that has an IP that matches the alternative branch target field 502. Initially, the valid target field is set to zero.

When the alternative branch target field 502 is updated with the alternate target, the Register Alias Table (RAT) branch field 510 is updated with a snapshot of the speculative register alias table. The RAT Branch 510 is used to start recovery when the mispredicted branch is resolved. Otherwise, the committed register alias table 510 is used when the mispredicted branch is retired.

All fetched instructions perform an associative lookup on the alternative branch target fields 502. Note that it is possible that the lookup produce a match with one or multiple entries. This is because an incoming instruction may be the target of several conditional branches that do not yet have a valid target. These branches may have the same IP or different IP. This is orthogonal to the case where several branches and their target reappear in the instruction windows, such as the case of a conditional branch within a loop, in which each new occurrence of a target resolves the last occurrence of the branch. In the case of a match with one or more entries, the entries with valid target field 504 equaling zero are updated. An example of this situation is shown in Table 1, as follows.

TABLE 1

| | Dynamic Instruction Stream Example | | |
|---|---|---|---|
| C-code | Assembly Code | Dynamic Instruction Stream | |
| while (flag) { | L1: cmp flag,0 | L1$_1$: cmp flag,0 | |
| | Jnz L2 | Jnz L2 | <p:NT> |
| If(x) | Cmp x,0 | Cmp x,0 | |
| | Jz L3 | Jz L3$_1$ | <p:NT> |
| <stmt1> | Stmt1 | Stmt1 | |
| <stmt0> | L3: stmt2 | L3$_1$: stmt2 | |
| } | Jmp L1: | Jmp L1$_2$: | |
| . . . | L2: // end of loop | L1$_2$: cmp flag,0 | |
| | | Jnz L2 | <p:NT> |
| | | Cmp x,0 | |
| | | Jz L3$_2$ | <p:NT> |
| | | Stmt1 | |
| | | L3$_2$: stmt2 | |
| | | Jmp L1$_3$: | |
| | | L2: // end of loop | |

In Table 1, an example of a C-code loop structure is shown, as converted to assembly language, and then a dynamic instruction stream. In the dynamic instruction stream, each appearance of L3 resolves the latest Jz instruction to L3. There are several such pairs, but only one L2. This resolves several (in this case 2) references of Jnz L2. In that case, all references have the same instruction pointer.

Returning to the case of a match with one or more entries, the valid target field 504 of the matching entries is set to 1. Next, the alternative target sequence fields 508 are updated with the sequence number of the matching instruction. The sequence number of an instruction indicates the relative order of appearance of the instruction within the instruction stream that is currently handled by the processor. This number can be thought of as the instruction's entry number in the instruction window. The alternative target sequence field 508 is used to find the location of the alternative target in the instruction window. Next the head pointer 308 is copied into to the alternative ABAT-ID fields 506 of all the matching ABAT entries. This is done in order to detect all the ABAT entries that will have to be evicted once the mispredicted branch is resolved, block 410. When the alternative target instruction of the branch undergoes renaming, the RAT alternative field 512 is updated with the snapshot of the speculative RAT. The RAT alternative 512 may differ from the branch RAT 510 due to the renaming of the destination register of all the instructions in the region between the branch and its alternative target. The difference between the two fields 510, 512 is used in order to identify those architectural registers that should undergo renaming in case of branch misprediction, block 412. In order to detect the alternative target, an extra field is added to the instruction window entries. This field is initialized for each conditional branch, with the ABAT entry number corresponding to it. When a conditional branch is mispredicted, this field is used to access its ABAT entry. If the valid target field 504 is set, the alternative target sequence field 508 is read in order to locate the alternative branch target 502 in the instruction window. To avoid this "double lookup," the alternative target sequence field may be saved in the instruction window instead of the ABAT 304.

When a branch is resolved, block 414, and correctly predicted, blocks 416–420, the execution proceeds normally. Advancing the ABAT's tail pointer 306 dismisses the branch's ABAT entry, block 418. However, if the branch has been incorrectly predicted, using the special instruction window field as an index, its corresponding ABAT entry is accessed, 422. If the valid target field 504 of this entry is zero, the target cannot be fetched from the instruction window, as determined by decision block 424. In this case, the traditional misprediction processing takes place, block 426, all the instructions that follow the mispredicted branch and all the ABAT entries are flushed, and instruction fetch is restarted from the correct branch target. However, if the branch was misdirected, and the valid target field is 1, the alternative target sequence field of the corresponding ABAT entry is used to detect the correct branch target in the instruction window, block 428. The Dependency Chain Recovery Mechanism (DCRM), as described below, is then used in order to recover from the misprediction, block 430.

Regardless of whether the branch was correctly predicted or not, and whether the detection of the alternative branch succeeded or not, the ABAT entry corresponding to the branch is always dismissed once the branch is committed.

Figure 6:
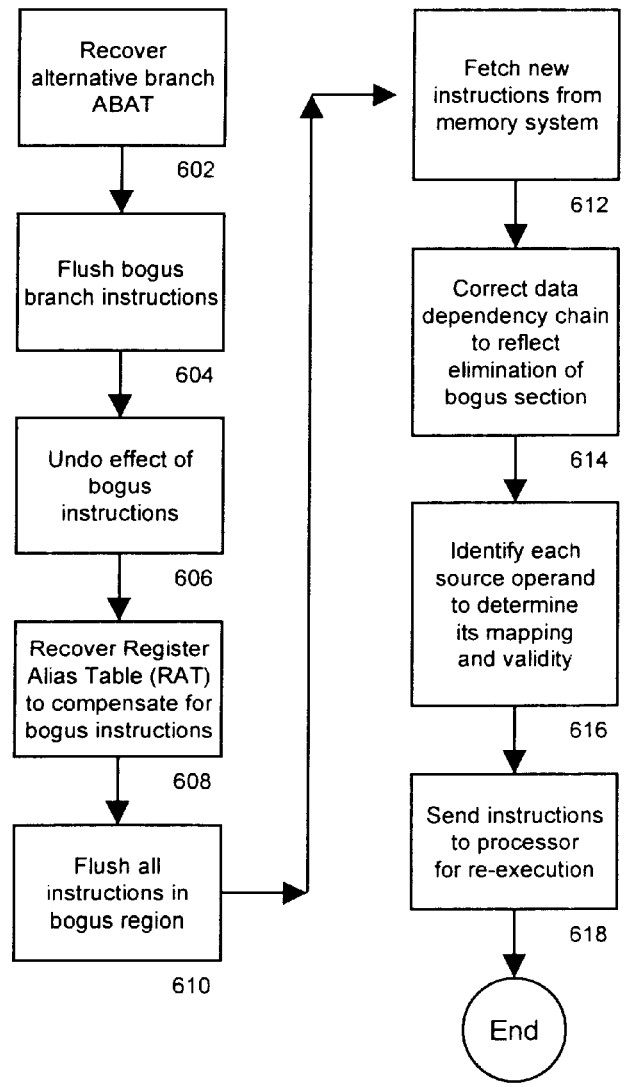
FIG. 6 is a flowchart of an embodiment of the Dependency Chain Recovery Mechanism (DCRM)

Moving to FIG. 6, when the alternative branch target is detected in the instruction window, the Dependency Chain Recovery Mechanism (DCRM) is used in order to recover from the misprediction.

Initially, the alternative branch-target address table (ABAT) 304 is recovered, block 602. All ABAT entries that are associated with branch instructions in the bogus region are flushed, block 604. The bogus region is defined as the sequence of instructions between the mispredicted branch and the alternative branch target. This can be accomplished by updating the ABAT tail pointer 306 with the value of the alternative ABAT ID field 506 of the misdirected branch and adding +1. Each logical register in the RAT branch 510 is compared with the corresponding RAT alternative 512. The goal is to correct the RAT branch 510 and RAT alternative fields 512 in the alternative branch-target address table 304. This is done in order to undo the effect of instructions in the remaining bogus region, block 606. Each ABAT entry that follows the bogus regions scanned, and their RAT branch 510 and RAT alternative 512 fields are updated according to the RAT branch 510 field of the misdirected branch. Note that the comparisons and recovery for the ABAT entries can be performed in parallel.

Next, a speculative Register Alias Table (RAT) branch 510 recovery is performed to compensate from the renaming that was caused by bogus instructions, block 608. In situations where an architectural register is renamed by an instruction in the bogus region, and also by a later instruction from the alternative target, then the later renaming is deemed to be valid. This is done by comparing each logical register in the RAT branch 510 with the corresponding entry in the RAT alternative 512 in a similar manner to the ABAT recovery. Each ABAT entry that follows the bogus region is scanned, and their speculative RAT branch information is updated according to the RAT branch 510 field of the misdirected branch. Note that the comparisons and recovery for these entries can also be performed in parallel.

All the instructions in the bogus region are flushed, block 610. This, too, can be done in parallel.

The front-end fetch engine begins fetching the instructions, which follow the last instruction in the instruction window, from the memory system, block 612. All these new instructions are not renamed as long as the speculative RAT was not corrected in the speculative RAT branch recovery. In addition, they are not needed to execute as long as the instructions they depend upon execute correctly, since they may be data dependent on instructions that need to be re-executed. In some embodiments, this fetching and non-renaming sequence is performed in parallel.

The data dependency chain is then corrected to reflect the elimination of the bogus section, block 614. The purpose is to identify each source operand to determine whether its mapping and its value are valid, block 616. There are several possible cases. The first case is that a register was set by an instruction prior to the bogus section; in this case, both its value and mapping are valid. If the register was set by an instruction within the bogus section, its value and mapping are invalid. If a register was set by an instruction following the bogus section, its value maybe invalid, but its mapping is valid.

Instructions are then sent to the processor for re-execution, block 618. Instructions that are resent to the processor for re-execution can cause deadlocks, since later dependent instructions may occupy all scheduling slots. Instructions that require re-execution should be reissued using methods, that are known in the art, that avoid this deadlock.

Optionally, comparisons between the RAT branch 510 and the RAT alternative 512 can be performed by comparing the two tables of fields once, by comparing the corresponding entries in parallel, then storing the comparison results in a separate table.

In alternate embodiments, a scoreboard maintains the physical register identifiers of all those registers that hold a correct value. This saves unnecessary re-executions in cases where the renaming was correct, but the source operand value is not guaranteed.

Once the dependency chain maintenance is completed, all the physical registers used for renaming the destination registers of bogus instructions are marked as free registers.

Figure 7:
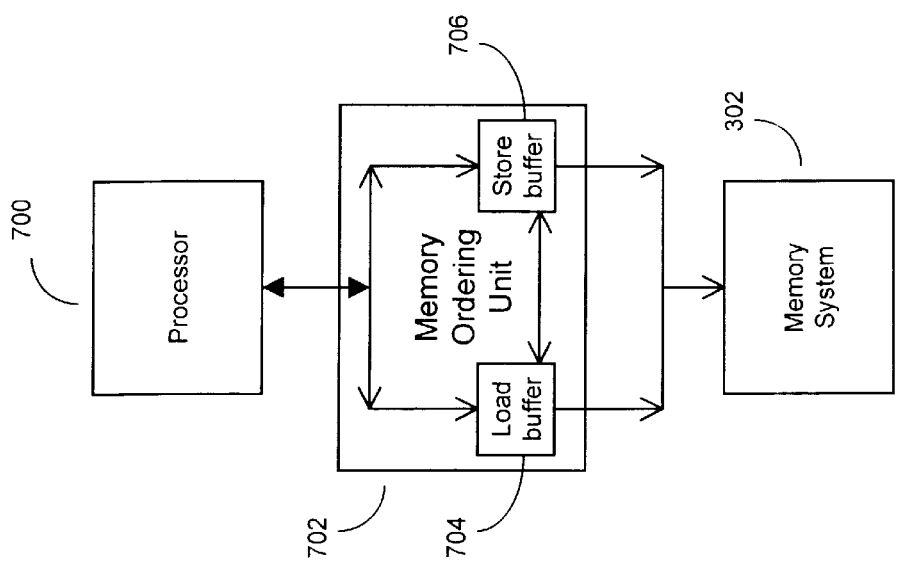
FIG. 7 is a block diagram showing the connection between the processor and the memory system.

In some alternate embodiments, the Dependency Chain Recovery Mechanism is modified to aid the recovery of bogus stores. These embodiments are designed to handle the situation where the re-execution of a load that is forwarded from a bogus store. In such a case, the reversal of bogus instruction effects, in block 606, is further enhanced. As shown in FIG. 7, a processor 700 is connected to a memory system 302 via a memory ordering unit 702. The memory ordering unit 702 comprises a load buffer 704 and a store buffer 706. The memory ordering unit 702 holds all the linear addresses of all stores in the machine, as well as their status in the store buffer 706. In a bogus store situation, each incoming memory load is snooped against a store buffer 706 of the memory ordering unit 702. This is done to determine from which load the store forwards. If there is some unknown address in the store buffer 706, the load cannot be ready to retire. If the load gets its data from the memory system 302, it receives a special indicator, which can be a marker bit, indicating that it does not forward from a store. If a memory flush condition is detected, the bogus entries are dismissed from the store buffer 706 only after the recover completes. The recovery process can be scoreboarded. The bogus forwarding condition is detected using a sequence number compare. If the load is forwarded from the bogus region, then it is considered a bogus forward. The re-execution of bogus loads is done upon retirement depending upon the forwarding state. Bogus forwards require re-execution of the load. Non-bogus forwarding and loads from memory or cache do not require re-execution of the load.

The previous description of the embodiments is provided to enable any person skilled in the art to make or use system and method. The various modifications to these embodiments will be readily apparent to those skilled in the art, and the generic principles defined herein may be applied to other embodiments without the use of inventive faculty. Thus, the present invention is not intended to be limited to the embodiments shown herein, but is to be accorded the widest scope consistent with the principles and novel features disclosed herein.

What is claimed is:

1. An apparatus comprising:
    a branch predictor to predict a branch target and an alternate branch target, and dismiss the alternate branch target when the branch target is correctly predicted;
    a memory system to accept the branch target from the branch predictor; an alternative branch-target address table to accept the alternate branch target from the branch predictor, and store the alternative branch target as an entry in the alternative branch-target address table; and
    a dependency chain recovery mechanism, if the predicted branch target is mispredicted and the alternative branch target is a valid target, to
        flush a sequence of invalid instructions between a predicted branch target and the alternate branch target,
        fetch a new instruction from the memory system,
        correct a data dependency chain to reflect the flush of the invalid instructions, and
        identify each source operand to determine its mapping and validity.

2. The apparatus of claim 1 wherein the alternative branch-target address table entries include:
    an alternative branch-target field to store the alternative branch target field from the branch predictor;
    a valid target field to indicate whether an instruction that follows an instruction branch matches the alternative branch target;
    an alternate target sequence field to store the instruction's position in an instruction window; and
    a register alias table branch field to store a speculative register alias table of the alternate branch target.

3. The apparatus of claim 2 wherein the alternative branch-target address table entries further include:
    an alternative branch address table identifier field to track alternative branch address table entries to be evicted after a mispredicted branch is resolved; and
    a register alias table branch alternative field to identify architectural registers that undergo renaming when branches are mispredicted.

4. The apparatus according to claim 1, wherein the alternative branch-target address table includes multiple entries, and head pointers and tail pointers define a region of valid entries.

5. The apparatus according to claim 4, wherein the multiple entries include an alternative branch target field, a valid target field, an alternative branch-target address table identifier field, an alternative target sequence field, a Register Alias Table branch field, and a Register Alias Table alternative field.

6. A method comprising:
    detecting a branch target within an instruction window;
    recovering an instruction dependency chain of the branch target within the instruction window;
    flushing a sequence of invalid instructions from the instruction window between a predicted branch target and an alternate branch target, if the predicted branch target is mispredicted and the alternate branch target is a valid target, leaving behind remaining instructions within the instruction window;
    fetching a new instruction from the memory system;
    correcting a data dependency chain to reflect the flush of the invalid instructions
    identifying each source operand to determine its mapping and validity;
    dismissing the alternate branch target after the branch target has been correctly predicted; and
    executing the remaining instructions.

7. The method of claim 6 further including:
    fetching new instructions from a memory system, and incorporating the new instructions with the remaining instructions.

8. A method comprising:
    fetching a branch instruction;
    looking up a target address of the branch instruction;
    associating the target address with an alternative branch-target address table entry;
    updating the alternative branch-target address table entry with a branch target determined by a branch predictor;
    determining the alternative branch-target address table entries that need to be evicted after a misprediction is resolved;
    identifying architectural registers that undergo renaming due to the misprediction by the branch predictor;
    resolving the branch instruction;

determining whether the branch instruction is mispredicted, and locating a target within an instruction window via the alternative branch-target address table after the branch instruction is mispredicted;

flushing a sequence of invalid instructions between a predicted branch target and the alternate branch target, if the predicted branch target is mispredicted and the alternate branch target is a valid target;

fetching a new instruction from the memory system;

correcting a data dependency chain to reflect the flush of the invalid instructions;

identifying each source operand to determine its mapping and validity; and dismissing the alternate branch target after the branch target is correctly predicted.

9. The method of claim 8 further including:

fetching new instructions from a memory system, and incorporating the new instructions with the remaining instructions.

10. The method of claim 9 further comprising:

executing the remaining instructions.

11. The method according to claim 8, wherein a region of valid alternative branch-target address table entries is defined by head pointers and tail pointers.

12. The method according to claim 11, wherein the valid alternative branch-target address table entries include an alternative branch target field, a valid target field, an alternative branch-target address table identifier field, an alternative target sequence field, a Register Alias Table branch field, and a Register Alias Table alternative field.

13. A method comprising:

flushing a sequence of all invalid branch instructions between a predicted branch target and an alternative branch target from an alternative branch-target address table, if the predicted branch target is mispredicted and the alternate branch target is a valid target leaving behind remaining instructions;

correcting the effect of the invalid branch instructions on the alternative branch-target address table;

recover from renamings caused by the invalid branch instructions;

fetching new instructions from a memory system, incorporating the new instructions with the remaining instructions;

correcting a data dependency chain in the memory system to reflect the elimination of the invalid instructions, and identifying each source operand to determine its mapping and validity;

mapping and validating the remaining instructions;

sending the remaining instructions to a processor for re-execution; and dismissing the alternate branch target after the branch target is correctly predicted.

14. The method of claim 13 wherein the remaining instructions are sent for re-execution using a method that avoids execution deadlocks.

15. The method according to claim 13, wherein the alternative branch-target address table includes multiple entries, and head pointers and tail pointers define a region of valid entries.

16. The method according to claim 15, wherein the multiple entries include an alternative branch target field, a valid target field, an alternative branch-target address table identifier field, an alternative target sequence field, a Register Alias table branch field, and a Register Alias Table alternative field.

17. A method comprising:

fetching a branch instruction;

looking up a target address of the branch instruction;

associating the target address with an alternative branch-target address table entry;

updating the alternative branch-target address table entry with a branch target determined by a branch predictor;

determining the alternative branch-target address table entries that need to be evicted after a misprediction is resolved;

identifying architectural registers that undergo renaming due to the misprediction by the branch predictor;

resolving the branch instruction;

determining whether the branch instruction is mispredicted, and locating a target within the instruction window via the alternative branch-target address table if the branch instruction is mispredicted;

flushing a sequence of all invalid branch instructions from the alternative branch-target address table, between a predicted branch target and the alternate branch target, if the predicted branch target is mispredicted and the alternate branch target is a valid target, leaving behind remaining instructions;

dismissing the alternate branch target after the branch target is correctly predicted;

correcting an effect of the invalid branch instructions on the alternative branch-target address table;

recover from renamings caused by the invalid branch instructions;

fetching new instructions from a memory system, incorporating the new instructions with the remaining instructions;

correcting a data dependency chain in the memory system to reflect the elimination of the invalid instructions, and identifying each source operand to determine its mapping and validity;

mapping and validating the remaining instructions; and sending the remaining instructions to a processor for re-execution.

18. The method of claim 17 wherein the remaining instructions are sent for re-execution using a method that avoids execution deadlocks.

19. The method according to claim 17, wherein a region of valid alternative branch-target address table entries is defined by head pointers and tail pointers.

20. The method according to claim 19, wherein the valid alternative branch-target address table entries include an alternative branch target field, a valid target field, an alternative branch-target address table identifier field, an alternative target sequence field, a Register Alias Table branch field, and a Register Alias Table alternative field.

21. A machine-readable medium having instructions which if executed by a machine cause the machine to:

fetch a branch instruction from the memory system;

look up a target address of the branch instruction from the branch predictor;

associate the target address with an alternative branch-target address table entry;

update the alternative branch-target address table entry with a branch target determined by a branch predictor; and determine the alternative branch-target address table entries to be evicted after a misprediction is resolved;

flush a sequence of invalid instructions between a predicted branch target and the alternate branch target, if the predicted branch target is mispredicted and the alternate branch target is a valid target;

fetch a new instruction from the memory system, correct a data dependency chain to reflect the flush of the invalid instructions;

identify each source operand to determine its mapping and validity; and dismiss the alternate branch target when the branch target is correctly predicted.

22. The machine-readable medium of claim 21, further having instructions which if executed by the machine cause the machine to:

identify architectural registers that undergo renaming due to the misprediction by the branch predictor;

remove the branch instruction; and determine whether the branch instruction is mispredicted; and locate a target within the instruction window via the alternative branch-target address table if the branch instruction is mispredicted.

23. The machine-readable medium of claim 21, further having instructions which if executed by the machine cause the machine to:

flush all invalid branch instructions from the alternative branch-target address table, leaving behind remaining instructions;

correct the effect of the invalid branch instructions on the alternative branch-target address table;

recover from renamings caused by the invalid branch instructions;

flush all invalid instructions from the alternative branch-target address table;

fetch new instructions from a memory system, incorporating the new instructions with the remaining instructions;

correct a data dependency chain in the memory system to reflect the elimination of the bogus instructions;

map and validate the remaining instructions; and re-execute the remaining instructions.

24. The machine-readable medium according to claim 21, wherein the alternative branch-target address table includes multiple entries, and head pointers and tail pointers define a region of valid entries.

25. The machine-readable medium according to claim 24, wherein the multiple entries include an alternative branch target field, a valid target field, an alternative branch-target address table identifier field, an alternative target sequence field, a Register Alias Table branch field, and a Register Alias Table alternative field.

26. A machine-readable medium having instructions which if executed by a machine cause the machine to:

fetch a branch instruction from the memory system;

flush a sequence of all invalid branch instructions from the alternative branch-target address table, between a predicted branch target and the alternate branch target, if the predicted branch target is mispredicted and the alternate branch target is a valid target, leaving behind remaining instructions;

dismiss the alternate branch target after the branch target is correctly predicted;

correct the effect of the invalid branch instructions on the alternative branch-target address table;

recover from renamings caused by the invalid branch instructions;

fetch new instructions from a memory system, incorporating the new instructions with the remaining instructions;

correct a data dependency chain in the memory system to reflect the elimination of the invalid instructions; and identify each source operand to determine its mapping and validity;

map and validate the remaining instructions; and re-execute the remaining instructions.

27. The machine-readable medium according to claim 26, wherein the alternative branch-target address table includes multiple entries, and head pointers and tail pointers define a region of valid entries.

28. The machine-readable medium according to claim 27, wherein the multiple entries include an alternative branch target field, a valid target field, an alternative branch-target address table identifier field, an alternative target sequence field, a Register Alias Table branch field, and a Register Alias Table alternative field.

* * * * *